Jan. 19, 1965  A. BOYD  3,166,184
BELT CONVEYOR ROLLER STRANDS
Filed June 13, 1962  2 Sheets-Sheet 1
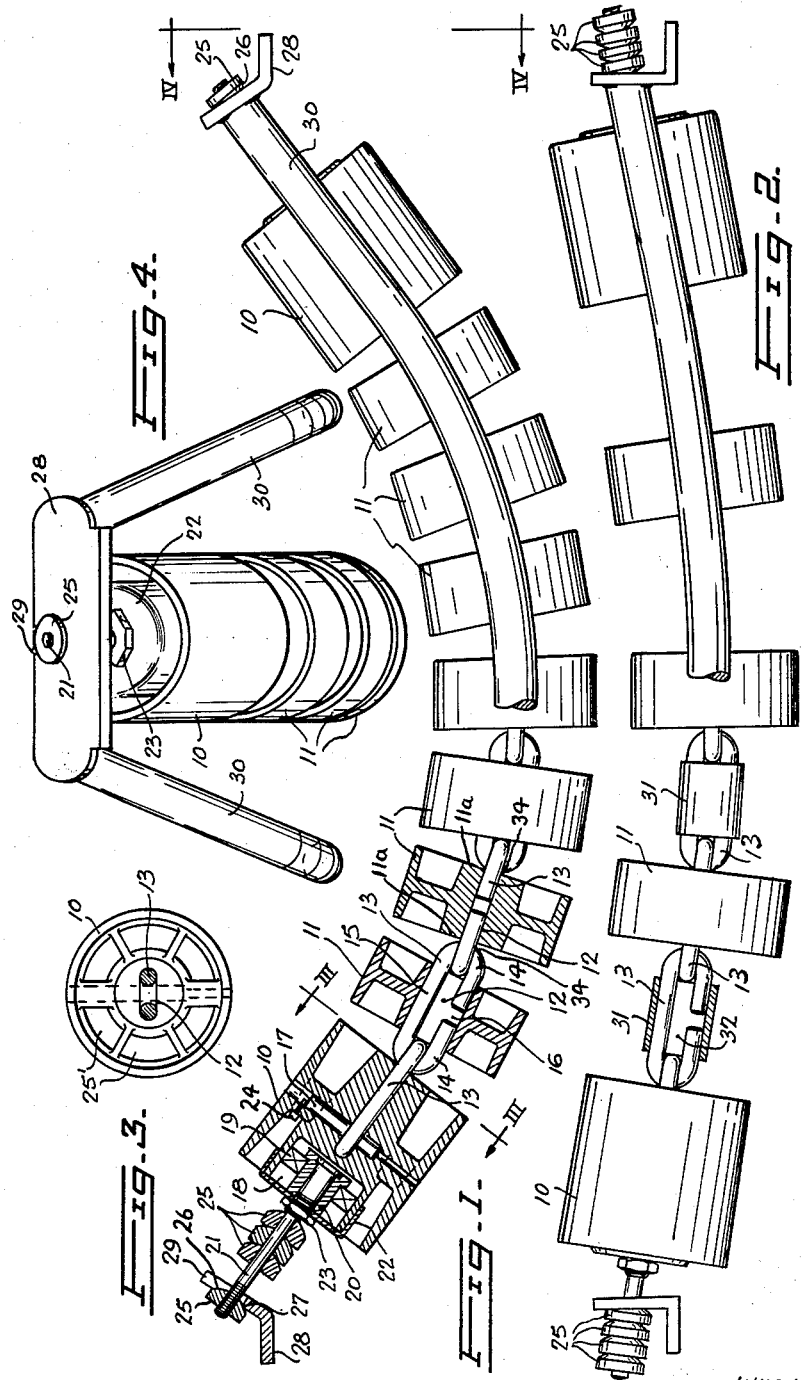

Jan. 19, 1965  A. BOYD  3,166,184
BELT CONVEYOR ROLLER STRANDS
Filed June 13, 1962  2 Sheets-Sheet 2

INVENTOR
ALEXANDER BOYD
By Emory L. Groff Jr.
Atty

United States Patent Office 3,166,184
Patented Jan. 19, 1965

3,166,184
BELT CONVEYOR ROLLER STRANDS
Alexander Boyd, 27 Wildwood Drive, Calgary,
Alberta, Canada
Filed June 13, 1962, Ser. No. 202,311
8 Claims. (Cl. 198—192)

This invention relates to improvements in belt conveyor roller strands, that is to say strands of idler rollers that support a belt conveyor at spaced intervals therealong, and may be either troughed for the working span of the belt or comparatively flat for the return span.

Belt conveyor roller strand assemblies fall into one of two main groups. In the first group, a fixed supporting cable is provided and each of the rollers is free to rotate independently on the cable. In the second type of construction, the rollers are fixed to the cable which is itself mounted to rotate in some suitable bearing or equivalent structure.

The principal disadvantage of the first type of construction is the risk of improper operation of the bearings by which each roller is mounted on the cable. Since each roller is rotatable independently of the other rollers and is rotated only by frictional contact with the moving belt, uneven loading of the belt, or a seized or stiff bearing, can cause one or more of the rollers to lag or stop. This results in rubbing contact between the belt and the slow or stopped roller, with consequential wear to both parts.

In the second type of construction the main fault experienced is failure of the cable itself. Its constant rotation while hanging curved in the shape of a catenary causes continually reversing of the stresses in the cable with a strong likelihood of eventual failure by fatigue or a requirement for complex or expensive design modifications to offset this weakness.

The present invention is directed towards a construction which falls into the second of these groups, in that the rollers are keyed to rotate with a curved supporting structure. However, the present construction avoids the use of a flexible cable with its attendant disadvantages.

Essentially, the invention consists of a belt conveyor roller strand having a plurality of rigid links each provided with a pair of hooked ends, such ends being hooked together in a chain to support a plurality of rollers. Each roller is formed with a non-circular slot (preferably flat) extending axially through it, and complementing the shape of the links. A link fits in each roller slot and projects from both ends of the roller to engage with its hooked end the hooked end of the next link. Each of the roller ends serves to form a closed loop with the hooked end of the link projecting from it, thus preventing the links becoming separated from each other. At the same time surfaces at the ends of each roller engage the projecting ends of adjacent links in order to position the roller axially, that is to prevent any axial sliding of the roller along the chain.

A manner in which the present invention may be carried into practice is illustrated in the accompanying drawings. It is to be understood that this illustration is provided by way of example only and that the invention is not limited to the specific features shown, being, in its broad scope, defined by the appended claims.

In the drawings:

FIGURE 1 is a side view, partly in central section, of a troughed strand of rollers for supporting the working span of a belt conveyor;

FIGURE 2 shows an alternative construction more particularly useful for supporting a return span of the conveyor;

FIGURE 3 shows a section on the line III—III in FIGURE 1;

FIGURE 4 shows an end view taken on the line IV—IV in FIGURE 1;

Figure 6:
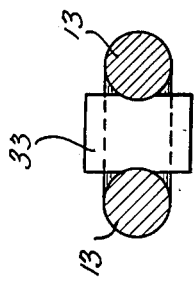
FIGURE 6 shows a section on the line VI—VI.

The strand shown in FIGURES 1, 3 and 4 consists of a pair of end rollers 10 and a plurality of intermediate rollers 11. All rollers 10 and 11 are formed with a flat, axially extending slot 12 in which there is positioned a rigid link 13. Each link 13 consists of two hooked ends 14 joined along one side at 15 and separated on the other side by a gap 16.

All the intermediate rollers 11 are identical with each other, as are all the links 13. As appears clearly from FIGURE 1, the hooked ends 14 of each link 13 project from each end of its associated roller 11 to be inter-linked with the corresponding hooked ends of the links projecting from adjacent rollers thereby to form a chain. Moreover, each end surface of a roller serves to form a closed loop with the hooked end projecting therefrom so that the ends cannot come unhooked. Such closed loop snugly surrounds and engages the hooked end of the next link of the chain.

The end rollers 10 are different insofar as is necessary to achieve a suitable bearing support for the strand. The link 13 entering each of the end rollers 10 is held in place by a wrist pin 17, and each roller 10 defines a cavity 18 in which is mounted a tapered roller bearing 19 that supports the roller 10 on a fixed sleeve 20 secured to a bearing pin 21. A bearing housing cap 22 is secured to the bearing pin 21 by being clamped between the bearing sleeve 20 and a nut 23. A retaining screw 24 holds the wrist pin 17 in place. As FIGURE 3 shows each of the end rollers 10 is provided with passageways 25' to allow any splashed water to drain down through the roller and not accumulate in the vicinity of the bearing.

Each of the bearing pins 21 is threaded at its end to support an end spacer 25 which has a part spherical surface 26 engaging a complementary surface 27 formed on an end frame member 28. The pin 21 enters the frame member 28 through slot 29. Additional similar end spacers may be used to increase or decrease the sag of the strand as required. FIGURE 2, for example, shows the comparatively flat strand produced when four end spacers 25 are used at each end. The degree of sag and the effective width of the roller strand assembly can also be varied, of course, by changing the number of rollers in the strand. The assembly is completed by side frame members 30.

The alternative construction shown in FIGURE 2 is similar to that already described with respect to FIGURE 1, except that each alternate roller has been replaced by a spacer sleeve 31 which has a slot 32 similar to the slots 12 and engaging a link 13 as before. The end surfaces of each spacer sleeve 31 nevertheless serve to form closed loops with the hooked ends of the link extending through such spacer sleeve to ensure that the chain cannot become separated. The construction of FIGURE 2 is especially suited to use with the return span of a conveyor belt where little or no load has to be carried.

In operation, the rollers 10 and 11 are keyed to the links 13 by virtue of the non-circular shape of the slots 12 so that the whole strand rotates as a single assembly. There is thus no possibility of a single roller seizing and wearing a groove in the belt. On the other hand, the manner of interconnecting the rollers is essentially simple. The necessary flexure takes place by a universal joint type of action between the hooked ends of the links.

Assembly is also especially convenient. A first link is positioned in an end roller where the link is fixed in place by a wrist pin 17. A second link is then hooked onto the projecting end of the first link, and such second link is then inserted through the slot of another roller to project beyond the opposite end of it. The operation is continued in this way until the other end roller is reached, and can be conducted from either end, since each link is of uniform exterior dimension throughout its full length and is thus able to enter a roller slot with either end.

By having a single link extending through each of the intermediate rollers to project from each end thereof, such link cooperating with a simple flat slot (or other non-circular shape complementary to that of the link), any possibility of independent rotation by the rollers is avoided. At the same time, the rollers are accurately positioned along the strand. No roller can move axially, because its end surface 11a abuts in each direction against an end surface 34 of the links projecting from adjacent rollers, which adjacent links cannot enter the slot in the first roller because they are turned 90° in relation thereto.

Thus, although the shape of the slots is obviously capable of modification to fit any modified link shape, it is not only essential that the slots be non-circular (to avoid rotation of a roller around a link), but it is also necessary (in the construction of FIGURES 1 to 4) that the slots will not accommodate links turned about their longitudinal axes from the primary position in which they complement the slot shape. In other words the slot shape must lack four-fold symmetry. A shape is said to have "four-fold symmetry" when it is unchanged by a 90° turn, for example, a square, or a cross in which the arms are of equal length and meet at right angles, or, of course, a circle. For the reasons explained above, the slots used in the construction of FIGURES 1 to 4 must lack "four-fold symmetry" to prevent axial movement of rollers, although they may, and generally will, exhibit some simpler symmetry.

As a practical matter a flat slot is the most convenient shape, as it is simple, and complements a normal flat link.

Figure 5:
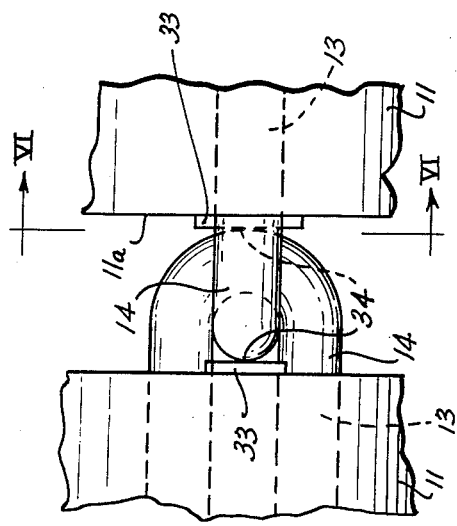
FIGURE 5 shows an enlarged fragmentary view of an alternative.

If the modification illustrated in FIGURES 5 and 6 is adopted, the shape of the slot becomes less important. It must still be of a shape suitable to receive the link shape, and must be non-circular to prevent free rotation of the roller around the link. But otherwise there will be no restriction on the shape of the slots themselves, because their ends are now covered by wear plates 33 fitted between the arms of the links 13 outwardly of each roller end surface to bear against the curved end surfaces 34 of the hooked ends 14 of each link 13. As well as providing readily replaceable surfaces to absorb the rubbing wear, each plate 33 provides a surface at the end of each roller against which link surfaces 34 abut to prevent any axial displacement of a roller along the chain of links, thus taking over the like function performed in the construction of FIGURES 1 to 4 by the end surfaces 11a of the rollers themselves. As will be plainly evident by now, some surface, be it the end surface of the roller itself, or be it a surface specially provided for the purpose (such as a wear plate), must be provided to cooperate with the end link surfaces 34 to prevent axial travel of the rollers along the chain.

It will be observed that the angle through which the strand turns at each point of flexure is comparatively small, with the result that the wear on the inter-engaging link surfaces will be comparatively slight.

It will also be noted that a relatively small number of different parts is required. Apart from the end rollers, the intermediate rollers are all identical with each other, as are the spacer sleeves. Similarly, all the links are the same and are interchangeable with each other.

I claim:
1. A belt conveyor roller strand comprising,
   (a) a plurality of rollers,
   (b) each roller being formed with a non-circular slot extending axially therethrough,
   (c) and a plurality of rigid links of cross-section complementary to said slots to fit therein,
   (d) said links having hooked ends joined together in a chain to support said rollers,
   (e) each of at least some of said links extending fully through the slot of an associated roller to project a said hooked end from each end of said roller with the roller serving to form a closed loop with the hooked end and thereby prevent separation of the links,
   (f) a surface at each end of each roller engaging the projecting ends of adjacent links to position such roller axially in relation to the links, and to maintain said rollers spaced apart from each other.

2. A belt conveyor roller strand according to claim 1, wherein said slots are generally flat in cross-section.

3. A belt conveyor roller strand according to claim 1, wherein each successive link engages the slot of a roller whereby the rollers are closely spaced from each other along the strand.

4. A belt conveyor roller strand according to claim 1, wherein spacer sleeves are mounted on selected links between the rollers whereby the rollers are widely spaced from each other along the strand, each of said spacer sleeves serving to form a closed loop with the hooked ends of the link associated therewith in a like manner to said rollers.

5. A belt conveyor roller strand according to claim 1, wherein said surface is the end surface of the roller itself.

6. A belt conveyor roller strand according to claim 1, wherein said surface is provided by a wear plate inserted between the end surface of the roller itself and the end of the adjacent link.

7. A belt conveyor roller strand according to claim 1, wherein each said closed loop formed by a roller and a hooked end of a link snugly surrounds and engages the hooked end of the adjacent link of the chain.

8. A belt conveyor roller strand according to claim 1, wherein each said link is of uniform exterior dimension throughout its full length whereby to be able to enter a roller slot with either end to facilitate assembly and disassembly of the strand.

References Cited by the Examiner

UNITED STATES PATENTS 392,318  11/88  Dutemple _____ 59—80

FOREIGN PATENTS 744,915  1/44  Germany.

SAMUEL F. COLEMAN, *Primary Examiner,*
WILLIAM B. LA BORDE, *Examiner.*